M. NASHOLD.

CENTRIFUGAL BLOCK MACHINE.

APPLICATION FILED DEC. 7, 1908.

Reissued Apr. 6, 1909. 12,935.

Witnesses.

G. A. Paulgeschmidt

James T. Crane.

By

Inventor.

Mengo Nasholds

D. Townsend

Atty

THE NORRIS PETERS CO., WASHINGTON, D. C.

UNITED STATES PATENT OFFICE.

MENZO NASHOLD, OF DAVIS JUNCTION, ILLINOIS, ASSIGNOR OF THREE-FOURTHS TO EARL E. GOULD, OF CHICAGO, ILLINOIS.

CENTRIFUGAL BLOCK-MACHINE.

No. 12,935. Specification of Reissued Letters Patent. Reissued April 6, 1909.

Original No. 900,414, dated October 6, 1908, Serial No. 414,103. Application for reissue filed December 7, 1908. Serial No. 466,427.

*To all whom it may concern:*

Be it known that I, MENZO NASHOLD, a citizen of the United States, residing at Davis Junction, in the county of Ogle and State of Illinois, have invented certain new and useful Improvements in Centrifugal Block-Machines, of which the following is a specification.

The object of this invention is to impart a centrifugal movement to a mold or molds containing a concrete or plastic mixture, which will thoroughly and uniformly pack the mixture.

A further object of my invention is to provide a mold having a movable section adapted to be automatically kept in contact with the mixture as it is being compacted in the mold by the action of the centrifugal movement imparted to said mold.

In the accompanying drawings forming part of this specification, and in which like figures of reference indicate corresponding parts, I have illustrated one form of device which embodies the essential features of my invention although I do not care to be limited to this precise construction as the illustration is but an embodiment of the invention which may be carried into effect in other ways without in the least departing from the spirit thereof, and in these drawings—

Figure 1:
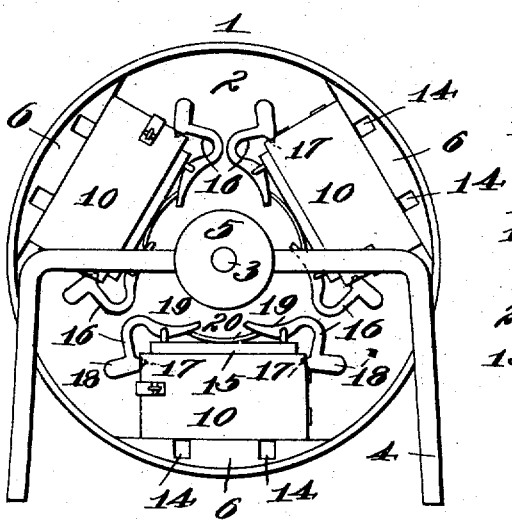
Figure 2:
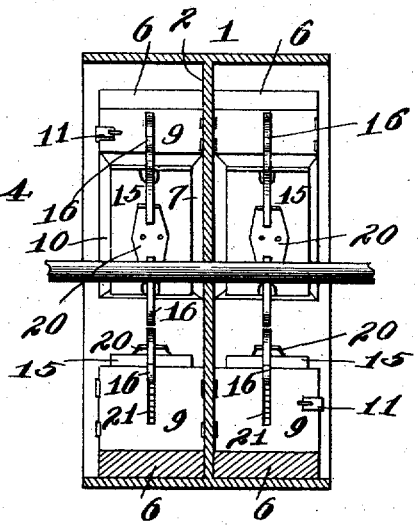
Figure 3:
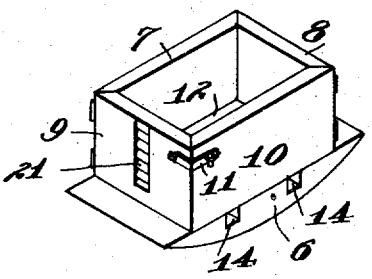
Figure 4:
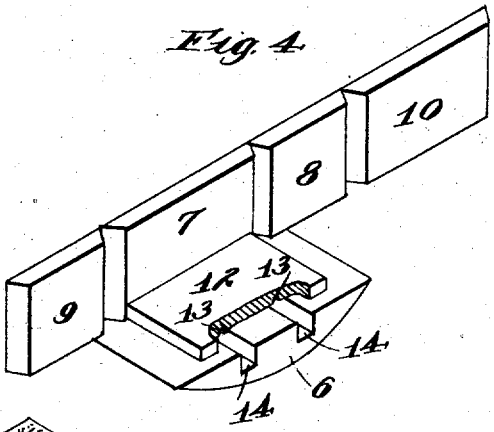
Figure 5:
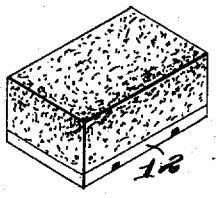

Figure 1 is an end elevation of my improved centrifugal block machine. Fig. 2 is a vertical central section. Fig. 3 is a perspective view of a mold and the pallet support. Fig. 4 is a perspective view of the mold in its open position showing the pallet and its support. Fig. 5 is a perspective view of the pallet and a concrete block thereon.

The drum 1 has a center transverse partition 2, and is supported by a shaft 3 extending in the lengthwise direction of the drum. The shaft 3 is supported by two stands 4, only one being shown, one being located at each end of the drum, a pulley 5 has a connection with the shaft and is rotated by a belt connection with a suitable driver.

To the inner face of the drum are secured pallet supports 6, in this instance three each side of the transverse partition, but a greater or less number may be provided according to the size of the drum, and the size of the supports. Each support, the mold and pallet for each support being the same, a description of one will answer.

To the transverse partition is permanently secured the back wall 7 of a mold and to this back wall are hinged ends 8 and 9. The front 10 of the mold is hinged to the end 8, and the free end of the front is detachably connected to the free end of the end 9 by the clasp 11. The ends and the front are supported to move over the pallet support 6. A pallet 12 is of a size to fit within the mold and has two holes 13 in its under face which communicates with the grooves 14 in the pallet support. A top 15 is of a size and form to fit closely within the open end of the mold and is movable radially when the machine is in operation. To the top at each end thereof is pivoted a catch 16 which has a hook 17, a handle 18 and a projecting portion 19. A plate spring 20 is secured to the center of the top, its free ends resting beneath the projecting portions 19 of the catches. The ends 8 and 9 of the mold are provided with saw toothed notches 21 arranged in a vertical series.

In use the pallet is placed in position within the mold, the ends and front of the mold are folded around the pallet and locked together. A moistened concrete or plastic mixture is placed in the mold and leveled off even with the open end of the mold. The top 15 is then placed over the concrete and the catches placed in engagement with the notches 21, the plate spring 20 will hold the catches in engagement with the ends of the mold. After the other molds are thus filled and closed, the drum is rotated, which will throw the concrete mixture outward thereby packing it close within the mold. This centrifugal force will also move the top to the mold against the concrete, as it packs in the mold. The catches 16 will engage the notches 21 and hold the top from dropping out as the drum rotates. After the drum has been rotated to pack the cement in the molds, the drum is stopped from rotating, and the tops removed from the molds, the molds are then opened and the pallets with the concrete blocks in position thereon removed in an axial direction from their supports by hooks entering the holes in the underside thereof. New pallets are inserted in place, the molds closed and the operations repeated. By revolving the molds, all tamping of the concrete is dispensed with.

Changes may be made in the size, proportion and details of my construction and I also contemplate such changes as mounting the drum in a vertical position or at an angle, or the use of a core in the mold if necessary to change the shape of the block being made, the essential features of my invention being to pack the mixture by centrifugal force, and to provide a movable section in the mold which will be automatically adjusted and held to the block as the mixture is compacted in the process of packing.

I claim as my invention:

1. In a centrifugal block machine, a revoluble drum, a mold stationarily secured to the inside of said drum, means for imparting a centrifugal movement to said drum whereby the mixture contained in the mold will be thoroughly and uniformly packed, the parts being so constructed and arranged as to permit the withdrawal of the block directly from the mold in an axial direction.

2. A mold, a radially movable top fitting in said mold, means for imparting a centrifugal movement to said mold whereby a mixture contained therein will be thoroughly and uniformly packed, and means for automatically moving and holding the aforesaid top in contact with the mixture throughout the packing operation.

3. In a centrifugal block machine, a revoluble drum, a web forming a partition therein, a plurality of molds stationarily secured to the inside of said drum, means for imparting a centrifugal movement to said drum whereby the contents of said several molds is simultaneously, uniformly and thoroughly packed and reduced to a solidified body, said parts being so arranged as to permit the withdrawal of the block directly from the mold in an axial direction.

4. A centrifugal block machine, comprising in combination a mold, a radially movable top for said mold, a removable pallet therein, means for imparting a centrifugal movement to said mold whereby a plastic mixture contained therein will be thoroughly and uniformly packed.

5. In a centrifugal block machine, a mold, a radially movable top for said mold, means for imparting a centrifugal movement to said mold whereby a mixture contained therein will be thoroughly and uniformly packed, and means for maintaining the top of the mold in contact with the mixture throughout the packing operation.

6. A centrifugal block machine, comprising in combination a mold, a radially movable cover therefor adapted to be advanced in the mold to contact with the contents thereof, means for imparting a centrifugal movement to the mold whereby the mixture contained therein will be compacted and said cover moved inwardly against the compacted mass and held in contact therewith throughout the packing operation.

7. A centrifugal block machine, comprising in combination a drum, a plurality of molds contained therein, a radially movable cover for each of said molds, means for imparting a centrifugal movement to said drum whereby the contents of said several molds is compacted, and means for automatically moving and holding said covers into contact with the contents of the molds throughout the packing operation.

8. A centrifugal block machine, comprising a rotatable drum, a mold located in the drum having one side secured to the drum, and other sections movable, a radially movable cover, a movable pallet and a stationary pallet support.

9. A centrifugal block machine, comprising a rotatable drum, a mold located in the drum having one side secured to the drum and other sections movable, a movable pallet, a stationary pallet support, a removable portion for the open end of the mold, and self adjusting catches for the removable portion.

10. A centrifugal block machine comprising a rotatable drum, a mold located in the drum having one side secured to the drum and other sections movable, a movable pallet, a stationary pallet support, a removable portion for the open end of the mold, and spring operated catches for the removable portion.

In testimony whereof I have hereunto set my hand in the presence of two subscribing witnesses.

MENZO NASHOLD.

Witnesses:
W. L. EYSTER,
C. E. OAKES.